June 2, 1931.  J. F. EDGAR  1,808,028
INTERNAL COMBUSTION ENGINE
Filed March 28, 1930
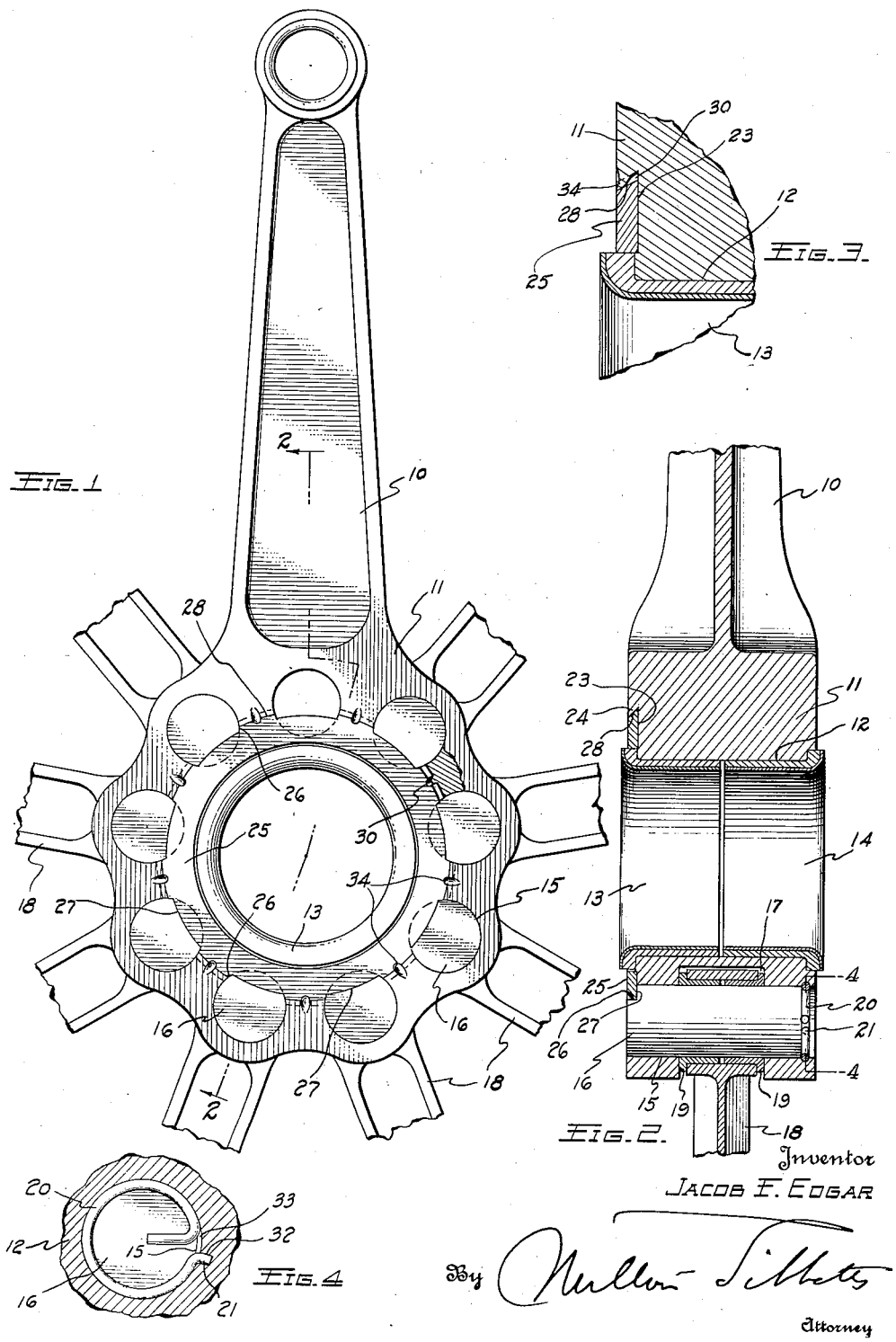
Inventor
JACOB F. EDGAR Patented June 2, 1931

1,808,028

UNITED STATES PATENT OFFICE

JACOB F. EDGAR, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed March 28, 1930. Serial No. 439,815.

This invention relates to internal combustion engines and more particularly to connecting rod assemblies for engines of the radial type.

An object of the invention is to provide a connecting rod assembly in which a common securing means for all of the connecting rod pins can be readily positioned and secured with the master rod hub.

Another object of the invention is to provide a connecting rod structure for radial engines in which a ring can be readily assembled and secured with the hub to prevent rotation and endwise displacement of the connecting rod pins and to prevent rotation of the ring relative to the hub.

A further object of the invention is to provide a connecting rod assembly in which a ring is associated with the hub and connecting rod pins to secure the same together.

Another object of the invention is to provide a connecting rod structure for radial engines in which a single element is employed to secure the connecting rod pins with the hub so that they will not rotate or become displaced endwise.

Still another object of the invention is to provide a connecting rod assembly for radial engines which can be readily assembled and secured together and which is formed with a small number of elements.

Another object of the invention is to provide a connecting rod structure for radial engines in which there is means associated permanently with one end of the hub to prevent rotation and endwise displacement of the connecting rod pins and detachable means which is associated with a hub and each of the pins so that the pins can be removed, if desired.

These and other objects of the invention will appear from the following description taken in connection with the drawings, which form a part of this specification, and in which:

Fig. 1 is an end elevation of a connecting rod assembly incorporating my invention;

Fig. 2 is a sectional view of the same taken on line 2—2 of Fig. 1;

Fig. 3 is an enlarged fragmentary sectional view illustrating the manner in which the retaining ring is secured to the master rod hub;

Fig. 4 is a sectional view taken on line 4—4 of Fig. 2 showing the removable retaining means associated with one end of each connecting rod pin.

Referring now to the drawings by characters of reference, 10 represents a master connecting rod for radial type engines which terminates at one extremity in a hub 11. The hub is formed with a central bore 12 into which a bearing formed of two parts 13 and 14 is pressed. The hub is also provided with a plurality of pin bores 15 arranged in a circular relation and with their axes parallel with the main bearing bore, and a connecting rod pin 16 is arranged in each of the bores 15. The hub is also provided with radially extending slots 17, one of which intersects each of the pin bores, and a connecting rod 18 extends into each of such slots and is pivotally mounted on the pin therein. The connecting rods are provided with a two-part bearing 19 for engagement with the associated connecting rod pin.

In order to retain the pins from being axially displaced from one end of the hub, I insert a spring wire retainer 20 within each of the connecting rod pin bores and one end of such rings is provided with a tang 21 which is projected into an opening 32 extending into the hub within the pin bore. There is also a circular groove 33 formed in the hub to receive the retaining spring 20 which forms a seat therefor. The resiliency of the retaining springs will maintain them in a closely related position with their seats and they project inwardly of the pin bores sufficiently to prevent endwise displacement of the pins. When it is desired to remove the pins, these retaining members 20 can be readily removed from the hub after slightly contracting them.

The end of the connecting rod hub, opposite that in which the retaining members 20 are assembled, is formed with a circular inwardly extending recess 23, the end wall of which is undercut to extend at an angle, as indicated at 24, so that the hub portions intermediate the pin bores will be overhanging. A retaining ring 25 is arranged within the groove 23 and the circumferential edge thereof is formed with recesses 26 arranged to intersect a portion of the pin bores and to extend across a portion of the ends of the pins, the ring being complementary to grooves 27 formed in the adjacent ends of the connecting rod pins 16 so that it will lie flush with the ends of the pins. Such engagement of the ring with the pins will prevent their rotation relative to the connecting rod hub and will also prevent axial displacement of the pins through this end of the hub. The circumferential edge of the ring retainer 25, intermediate the recesses 26, is of an angular form as indicated at 28, and preferably arranged to extend complementary to the angular wall forming the edge of the groove 23. In this manner, a portion of the connecting rod hub intermediate the pin bores will overlie the angular edge of the ring member. In order to secure the ring member with the hub of the connecting rod, I peen a portion of the edge of the connecting rod hub overlying the retaining ring so that the metal bosses 34, thus formed, will project into a groove 30 formed in the perimeter of the ring member. Through the above arrangement, rotation of the ring securing member relative to the connecting rod hub and endwise displacement of the ring member from the hub is prevented.

In assembling the ring member with the connecting rod hub, the recesses 27 are placed complementary to the portion of the hub intermediate the connecting rod pin bores, whereupon the ring can be moved axially into the recess 23, and the ring retaining member is then rotated to the position shown in Fig. 1, whereupon the peening operation is performed, thus retaining the ring permanently in desired position with the hub. After this operation, the pins are inserted into the bores 15 and through the bores, whereupon they are rotated until the grooved end is complementary to the overlying ring portion. The pins can then be moved axially into position of final assembly, and the spring retaining members 20 are applied.

It will be seen that a single member is utilized to prevent rotation of all of the connecting rod pins relative to the hub, and also that this ring member prevents axial displacement of the pins through one end of the hub. It will also be seen that this simple form of retaining means can be readily assembled into the desired permanent relation with the master rod hub. The manner of retaining the ends of the connecting rod pins, remote from the single retaining ring, permits the quick removal of the pins and rods and facilitates the assembly thereof.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a connecting rod assembly for radial engines, a master rod hub having circularly arranged pin bores therethrough, said hub having a circular recess at one end intersecting the pin bores, a ring seated in the circular recess in the hub end, said ring underlying the hub end intermediate the pin bores, connecting rod knuckle pins in the bores, said pins having a recessed end complementary to the intersecting portions of the ring, and retaining means for the end of the pins opposite the ring.

2. In a connecting rod assembly, a master rod hub having circularly arranged pin bores therethrough, one end of the hub having a circular undercut recess intersecting the bores, a ring in the recess having grooves underlying the undercut recess, portions of the outer circumferential edge of the hub overlying the recesses being peened into the ring grooves, connecting rod knuckle pins in the bores in the hub having a recessed end complementary to the ring, and retaining means in the bores associated with the other end of the pins.

3. In a connecting rod assembly, a master rod hub having a main bore and circularly arranged pin bores therethrough, said hub having a circular recess in one end adjacent the main bore and intersecting a portion of the pin bores, the outer portion of the recess intermediate the pin bores being undercut, a ring in the recess having portions extending into the undercut portion thereof, means securing the ring in the recess, connecting rod pins in the pin bores having one end engaging the ring to prevent rotation and axial displacement thereof relative to the hub, and retaining means for the other ends of the pins.

4. In a connecting rod assembly, a master rod hub having a main bore and circularly arranged pin bores therethrough, said hub having a circular recess in one end partially intersecting the pin bores and the recessed portion intermediate the pin bores undercut, a ring retainer having a portion of its perimeter complementary to the circular recess and recesses complementary to the pin bores, whereby said ring may be movable axially into the recesses with the perimeter complementary to the pin bores and then rotated to underlie the undercut recess portion, means for permanently fixing the ring to the hub, connecting rod pins in the pin bores having ends complementary to and projecting into the space defined by the ring and the adjacent bores, and retaining means in the pin bores associated with the other end of the pins.

5. In a connecting rod assembly, a master rod hub having a main bore and a plurality of pin bores arranged circularly about the main bore, said hub having a circular recess at one end adjacent the main bore and intersecting a portion of the pin bores, grooved sectors forming parts of the circular recess intermediate the pin bores having an angular perimeter, a ring in the grooves having sectors complementary to the angular perimeter thereof, means permanently fixing the ring in the recess, connecting rod pins in the pin bores having an end held against rotation and axial displacement by the ring, and pin retaining means in the hub bores associated with the other end of the pins.

In testimony whereof I affix my signature.

JACOB F. EDGAR.